: # (12) United States Patent
Meier et al.

(10) Patent No.: US 6,596,796 B1
(45) Date of Patent: Jul. 22, 2003

(54) STABILIZERS FOR EMULSION CRUDE RUBBERS, SYNTHETIC LATEX AND NATURAL RUBBER LATEX

(75) Inventors: Hans-Rudolf Meier, Fribourg (CH); Gerrit Knobloch, Magden (CH); Paul Dubs, Cham (CH); Samuel Evans, Marly (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 143 days.

(21) Appl. No.: 09/688,417

(22) Filed: Oct. 16, 2000

(30) Foreign Application Priority Data

Oct. 18, 1999 (CH) ............................. 1899/99
Oct. 18, 1999 (CH) ............................. 1900/99

(51) Int. Cl.[7] ..................... C08K 5/134; C08K 5/375; C08L 21/00; C08L 9/00; C08L 7/00
(52) U.S. Cl. ..................... 524/291; 524/330; 524/331
(58) Field of Search ......................... 524/291, 330, 524/331

(56) References Cited

U.S. PATENT DOCUMENTS

| | | | |
|---|---|---|---|
| 3,330,859 A | | 7/1967 | Dexter et al. ............... 260/473 |
| 3,962,123 A | * | 6/1976 | DiBattista et al. ........... 252/400 |
| 4,228,297 A | | 10/1980 | Haeberli et al. .............. 560/75 |
| 4,699,972 A | | 10/1987 | Hammer et al. ............. 528/293 |
| 4,713,475 A | | 12/1987 | Spivack et al. ............... 560/75 |
| 4,857,572 A | * | 8/1989 | Meier et al. ................ 524/289 |
| 5,658,866 A | | 8/1997 | Yoshida et al. .............. 508/503 |
| 5,696,281 A | | 12/1997 | Evans .......................... 560/75 |
| 5,728,317 A | | 3/1998 | Laqua et al. ............ 252/182.29 |

FOREIGN PATENT DOCUMENTS

| | | |
|---|---|---|
| DE | 4041320 | 6/1992 |
| DE | 4244609 | 7/1994 |
| DE | 19701869 | 9/1997 |
| EP | 0428973 | 5/1991 |
| EP | 0972796 | 1/2000 |
| GB | 2252324 | 8/1992 |
| WO | WO 9844034 A1 * 10/1998 .......... C08F/236/00 |

OTHER PUBLICATIONS

Chem. Abstr. vol. 122, (1995), 122:190245a for DE 4244609.
Derwent Abstr. 1999–566672 [48] for JP 11246712 (1999).
Chem. Abstr. 132:209021 for H. Meier et al., Polymer Additives (1999), pp. 71–89.
Chem. Abstr. vol. 127:301203b for DE 19701869 (1997).
Chem. Abstr. vol. 117:112283k for DE 4041320 (1992).
Hans–Georg Elias, An Introduction to Polymer Science, Chapter 12, Elastomers, pp. 388–393, (1997).

* cited by examiner

*Primary Examiner*—Kelechi Egwim
(74) *Attorney, Agent, or Firm*—Kevin T. Mansfield

(57) ABSTRACT

There are described compositions comprising
a) an emulsion crude rubber, synthetic latex or natural rubber latex subject to oxidative, thermal, dynamic and/or light-induced degradation, and
b) as stabilizer at least one compound of formula I

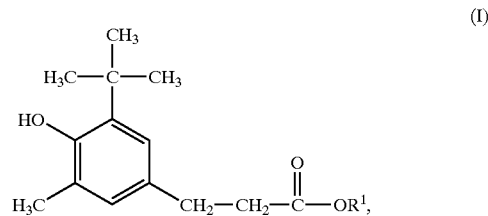

wherein $R^1$ is $C_8$–$C_{20}$alkyl;
and optionally
c) as further stabilizer at least one compound of formula II

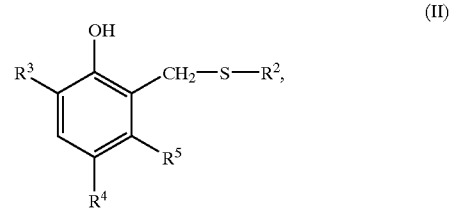

wherein $R^2$ is $C_8$–$C_{12}$alkyl, $R^3$ is hydrogen, $C_1$–$C_{12}$alkyl, cyclohexyl, 1-methylcyclohexyl, benzyl, α-methylbenzyl, α,α-dimethylbenzyl or —$CH_2$—S—$R^2$,
$R^4$ is $C_1$–$C_{12}$alkyl, benzyl, α-methylbenzyl, α,α-dimethylbenzyl or —$CH_2$—S—$R^2$, and
$R^5$ is hydrogen or methyl.

16 Claims, No Drawings

STABILIZERS FOR EMULSION CRUDE RUBBERS, SYNTHETIC LATEX AND NATURAL RUBBER LATEX

The present invention relates to compositions comprising an emulsion crude rubber, synthetic latex or natural rubber latex subject to oxidative, thermal, dynamic and/or light-induced degradation and, as stabiliser, at least one compound of the β-(5-tert-butyl-4-hydroxy-3-methylphenyl) propionic acid ester type, and also to the use thereof as colour-stable and non-discolouring stabilisers for stabilising emulsion crude rubbers, synthetic latices or natural rubber latices against oxidative, thermal, dynamic and/or light-induced degradation, and to a method of stabilising emulsion crude rubbers, synthetic latices or natural rubber latices, in which method at least one compound of the β-(5-tert-butyl-4-hydroxy-3-methylphenyl)propionic acid ester type is incorporated therein or applied thereto.

The present invention relates also to compositions comprising, in addition to at least one stabiliser of the β-(5-tert-butyl-4-hydroxy-3-methylphenyl)propionic acid ester type, also at least one stabiliser of the alkylthiomethylphenol type, and to the use of such stabiliser combinations and also to a method of stabilising emulsion crude rubber, synthetic latex or natural rubber latex therewith, especially carboxylated latex.

Those stabiliser combinations consisting of β-(5-tert-butyl-4-hydroxy-3-methylphenyl)-propionic acid esters and alkylthiomethylphenols exhibit a synergistic effect.

The stabilisers used in the composition according to the invention are all generally in liquid form and yield stable emulsions that have not been obtainable hitherto using solid stabilisers.

Emulsion rubbers are manufactured by emulsion polymerisation. Emulsion polymerisation in water, which is initiated with redox initiators at low temperatures (cold rubber) or at relatively high temperatures (hot rubber) with organic peroxides or persulfates, as the case may be, yields latices that are used as such or are processed to yield solid rubber. The molar weights of emulsion SBR are in the range of about from 250 000 to 800 000 g/mol; cold and hot rubbers differ in the degree of branching. The rubbers are sold as such or blended with oil or loaded with carbon blacks and constitute the most important synthetic rubbers.

Natural rubber latex and a wide variety of types of synthetic latices are available commercially. Polymer latices are colloidal dispersions of rubber or of a plastic material in an aqueous medium. The polymeric material may be a polymer of small ethylenic (olefinic) monomers or diene monomers or alternatively a copolymer of two or more such monomers. The mechanical stability of such latices depends principally upon the presence of surface-active substances at the interface between polymer particle and aqueous phase.

Most synthetic latices consist of styrene-butadiene, styrene-acrylic acid, acrylic acid esters, vinyl acetate-acrylate or butadiene-acrylonitrile. Carboxylated latices, such as carboxylated SBRs, additionally comprise, for example, up to 5% of the monomer unit containing the carboxyl group or corresponding carboxylic acid esters. Advantageously there are used as organic acid unsaturated mono- and di-carboxylic acids, such as acrylic acid, methacrylic acid and, for example, methylenesuccinic acid (itaconic acid). As carboxylic acid esters, which are used, for example, as comonomers for vinyl acetate, there is principally used fumaric acid diethyl ester, maleic acid diethyl ester, methyl acrylate, n-butyl acrylate or 2-ethylhexyl acrylate.

The organic acid used determines, to a considerable degree, the properties of the carboxylated SBRs obtained at reaction temperatures of from about 60 to about 100° C. There may be mentioned by way of example the water solubility or the final working properties, which are substantially influenced by the number of carboxyl groups on the surface of the latex. A typical mixture of components and the properties thereof are described in Polymer Latices and their Application (Applied Science Publishers Ltd., London 1982; Editor K. O. Calvert), pages 29 to 31. The main use of such X-SBRs is in the paper industry, the adhesives industry and also in the textile industry and, in the latter case, specifically in the field of carpeting. In the paper industry, carboxylated latices are used, for example, for surface-coatings for paper; in the adhesives industry they are used, for example, for dispersion adhesives and in the dyestuffs industry they are used, for example, for disperse dyes.

The articles produced from the latex have to be stabilised against the action of heat and oxygen by means of antioxidants.

The use of emulsions consisting, for example, of compounds of the β-(5-tert-butyl-4-hydroxy-3-methylphenyl) propionic acid ester type as stabilisers for organic polymers is known, for example, from U.S. Pat. No. 3,962,123. U.S. Pat. No. 5,658,866 describes specific stabilisers of the β-(5-tert-butyl-4-hydroxy-3-methylphenyl)propionic acid ester type in lubricating oil compositions.

The use of compounds of the 2-methyl-4,6-bis (alkylthiomethyl)phenol type is described in U.S. Pat. No. 4,857,572.

It has now been found that certain compounds of the β-(5-tert-butyl-4-hydroxy-3-methylphenyl)propionic acid ester type are especially suitable as stabilisers for emulsion crude rubbers, synthetic latices or natural rubber latices that are sensitive to oxidative, thermal, dynamic and/or light-induced degradation.

The present invention accordingly relates to compositions comprising
a) an emulsion crude rubber, synthetic latex or natural rubber latex subject to oxidative, thermal, dynamic and/or light-induced degradation, and
b) as stabiliser at least one compound of formula I

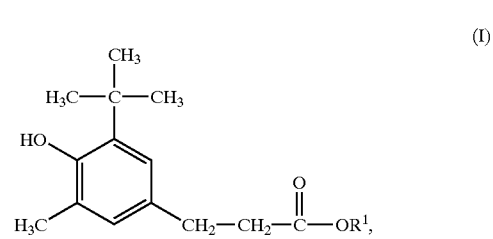

wherein $R^1$ is $C_8$–$C_{20}$alkyl.

Of interest are compositions wherein $R^1$ is $C_8$–$C_{13}$alkyl, especially branched $C_8$–$C_{13}$alkyl.

Of special interest are compositions wherein $R^1$ is isooctyl and/or isotridecyl.

Of very special interest are compositions wherein $R^1$ is isooctyl or isotridecyl.

The compositions according to the invention advantageously comprise c) as further stabiliser at least one compound of formula II

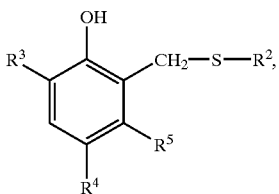

(II)

wherein $R^2$ is $C_8$–$C_{12}$alkyl, $R^3$ is hydrogen, $C_1$–$C_{12}$alkyl, cyclohexyl, 1-methylcyclohexyl, benzyl, α-methylbenzyl, α,α-dimethylbenzyl or —$CH_2$—S—$R^2$, $R^4$ is $C_1$–$C_{12}$alkyl, benzyl, α-methylbenzyl, α,α-dimethylbenzyl or —$CH_2$—S—$R^2$, and $R^5$ is hydrogen or methyl.

Of interest are compositions wherein $R^2$ is $C_8$alkyl or $C_{12}$alkyl.

Of special interest are compositions wherein $R^3$ is $C_1$–$C_8$alkyl, benzyl or α-methylbenzyl, $R^4$ is $C_1$–$C_9$alkyl or —$CH_2$—S—$R^2$, and $R^5$ is hydrogen or methyl.

Of particular interest are compositions wherein $R^3$ is $C_1$–$C_4$alkyl or benzyl, $R^4$ is $C_1$–$C_4$alkyl or —$CH_2$—S—$R^2$, and $R^5$ is hydrogen or methyl.

Preference is given to compositions wherein $R^2$ is $C_8$alkyl or $C_{12}$alkyl, $R^3$ is methyl, $R^4$ is —$CH_2$—S—$R^2$, and $R^2$ is $C_8$alkyl or $C_{12}$alkyl, and $R^5$ is hydrogen.

The combinations of components (b) and (c) of formulae I and 11 exhibit a synergistic action upon the substrate to be stabilised, that is to say upon the emulsion rubber, the synthetic latex or the natural rubber latex and articles manufactured therefrom.

Alkyl having up to 20 carbon atoms denotes a branched or unbranched radical, for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl or eicosyl. One of the preferred meanings of $R^1$ is branched $C_8$–$C_{13}$alkyl, especially isooctyl and/or isotridecyl, more especially isooctyl or isotridecyl. One of the preferred meanings of $R^2$ is $C_8$–$C_{12}$alkyl, especially $C_8$alkyl or $C_{12}$alkyl.

The compounds of the β-(5-tert-butyl-4-hydroxy-3-methylphenyl)propionic acid ester type as component (b) in the composition according to the invention are known in the literature and their preparation is described, for example, in U.S. Pat. No. 5,658,866 or U.S. Pat. No. 5,696,281.

The compounds of the alkylthiomethylphenol type as component (c) in the composition according to the invention are also known in the literature and their preparation is described, for example, in U.S. Pat. No. 4,857,572.

The compounds of formula I, especially also in combination with compounds of formula II, are excellently suitable for stabilising emulsion crude rubber, synthetic latex or natural rubber latex, especially also pale emulsion crude rubber, pale synthetic latex or pale natural rubber latex, against oxidative, thermal, dynamic and/or light-induced degradation.

Elastomers manufactured from emulsion crude rubbers according to one of the customary processes (vulcanisation, for example, with sulfur or peroxide) are to be understood as being macromolecular materials that at room temperature, after considerable deformation under low stress, are capable of returning rapidly to virtually their original shape. See also Hans-Georg Elias, An Introduction to Polymer Science, chapter 12, Elastomers, pages 388–393, 1997, VCH Verlagsgesellschaft mbH, Weinheim, Germany; or Ullmann's Encyclopedia of Industrial Chemistry, Fifth, Completely Revised Edition, Volume A 23, pages 221–440 (1993).

The compositions according to the invention may comprise as emulsion crude rubbers, for example, the following materials:

1. Polymers of diolefins, for example polybutadiene or polyisoprene.
2. Copolymers of mono- and di-olefins with one another or with other vinyl monomers, for example propylene-isobutylene copolymers, propylene-butadiene copolymers, isobutyleneisoprene copolymers, ethylene-alkyl acrylate copolymers, ethylene-alkyl methacrylate copolymers, ethylene-vinyl acetate copolymers, acrylonitrile/butadiene copolymers and terpolymers of ethylene with propylene and a diene, such as hexadiene, dicyclopentadiene or ethylidenenorbornene.
3. Copolymers of styrene or α-methylstyrene with dienes or with acrylic derivatives, for example styrene-butadiene, styrene-butadiene-alkyl acrylate and methacrylate; and block copolymers of styrene, for example styrene-butadiene-styrene or styrene-isoprene-styrene.
4. Halogen-containing polymers, for example polychloroprene, chlorinated rubber, chlorinated and brominated copolymer of isobutylene-isoprene (halobutyl rubber).
5. Natural rubber.
6. Aqueous emulsions of natural or synthetic rubbers, for example natural rubber latex or latices of carboxylated styrene-butadiene copolymers.

The emulsion crude rubbers to be protected are preferably polydiene rubbers or halogen-containing polydiene emulsion crude rubbers, especially styrene-butadiene copolymer emulsion crude rubbers.

The compositions according to the invention may comprise as latices, for example, the following materials:

1. Copolymers of mono- and di-olefins with other vinyl monomers, for example ethylene-alkyl acrylate copolymers, ethylene-alkyl methacrylate copolymers, ethylene-vinyl acetate copolymers and acrylonitrile/butadiene copolymers.
2. Copolymers of styrene or α-methylstyrene with dienes or with acrylic derivatives, for example styrene-butadiene, styrene-butadiene-alkyl acrylate and methacrylate.
3. Natural rubber.
4. Aqueous emulsions of natural or synthetic rubbers, for example natural rubber latex, latices of styrene-butadiene or of carboxylated styrene-butadiene copolymers.

The latex to be protected is preferably a carboxylated styrene-butadiene, a styrene-acrylic acid, a vinyl acetate-acrylate or a carboxylated butadiene-acrylonitrile. Of particular interest is a carboxylated styrene-butadiene latex (X-SBR).

Component (b) of formula I is added to the emulsion crude rubber, synthetic latex or natural rubber latex to be stabilised advantageously in an amount of from 0.01 to 10%, for example from 0.02 to 5%, preferably from 0.05 to 1.0%, based on the dry solids content of the emulsion crude rubber, synthetic latex or natural rubber latex to be stabilised.

Component (c) of formula II is added, in combination with component (b) of formula 1, to the emulsion crude rubber, synthetic latex or natural rubber latex to be stabilised advantageously each in an amount of from 0.01 to 5%, for example from 0.02 to 5%, preferably from 0.05 to 1.0%, based on the dry solids content of the emulsion crude rubber, synthetic latex or natural rubber latex to be stabilised.

Of particular interest are compositions comprising from 0.01 to 5% by weight of component (b) of formula I and from 0.01 to 5% by weight of component (c) of formula II, based on the weight of the dry solids content of component (a).

In addition to components (a), (b) and (c), the compositions according to the invention may comprise further additives, for example the following additives:

1. Anti-oxidants 1.1. Alkylated monophenols, for example 2,6-di-tert-butyl-4-methylphenol, 2-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-di-methylphenol, 2,6-dioctadecyl-4-methylphenol, 2,4,6-tricyclohexylphenol, 2,6-di-tert-butyl-4-methoxymethylphenol, nonylphenols that are linear or branched in the side chain, for example 2,6-di-nonyl-4-methylphenol, 2,4-dimethyl-6-(1'-methylundec-1'-yl)-phenol, 2,4-dimethyl-6-(1'-methylheptadec-1'-yl)-phenol, 2,4-dimethyl-6-(1'-methyltridec-1'-yl)-phenol and mixture thereof.

1.2. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

1.3. Tocopherols, for example α-tocopherol, β-tocopherol, γ-tocopherol, δ-tocopherol and mixtures thereof (Vitamin E).

1.4. Hydroxylated thiodiDhenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulfide.

1.5. Alkyidene bisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclo-hexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl) dicyclopentadiene, bis[2-(3'-tert-butyl-2'-hydroxy-5'-methylbenzyl)-6-tert-butyl-4-methylphenyl]terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra(5-tert-butyl-4-hydroxy-2-methylphenyl)pentane.

1.6. O- N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzyl mercaptoacetate, tris(3,5-di-tert-butyl-4-hydroxybenzyl)-amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.7. Hydroxybenzylated malonates, for example dioctadecyl 2,2-bis(3,5-di-tert-butyl-2-hydroxybenzyl)malonate, dioctadecyl 2-(3-tert-butyl-4-hydroxy-5-methylbenzyl) malonate, didodecylmercaptoethyl 2,2-bis(3,5-di-tert-butyl-4-hydroxybenzyl)malonate, di[4-(1,1,3,3-tetramethylbutyl) phenyl]2,2-bis(3,5-di-tert-butyl-4-hydroxybenzyl)malonate.

1.8. Hydroxybenzyl aromatic compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.9. Triazine comnounds, for example 2,4-bisoctylmercapto-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris-(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl)isocyanurate.

1.10. Benzyl phosphonates, for example dimethyl 2,5-di-tert-butyl-4-hydroxybenzyl-phosphonate, diethyl 3,5-di-tert-butyl-4-hydroxybenzylphosphonate, dioctadecyl 3,5-di-tert-butyl-4-hydroxybenzylphosphonate, dioctadecyl 5-tert-butyl-4-hydroxy-3-methylbenzyl-phosphonate, calcium salt of 3,5-di-tert-butyl-4-hydroxybenzylphosphonic acid monoethyl ester.

1.11. Acylaminophenols, for example 4-hydroxylauric acid anilide, 4-hydroxystearic acid anilide, N-(3,5-di-tert-butyl-4-hydroxyphenyl)carbamic acid octyl ester.

1.12. Esters of β-(3,5-di-tert-butyl-4-hydroxvphenyl) propionic acid with mono- or poly-hydric alcohols, for example with methanol, ethanol, n-octanol, iso-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl) oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.13. Esters of β-(3,5-dicyclohexyl-4-hydroxyphenyl) propionic acid with mono- or poly-hydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo-[2.2.2]octane.

1.14. Esters of 3,5-di-tert-butyl-4-hydroxyphenylacetic acid with mono- or poly-hydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)-oxalic acid diamide, 3-thiaundecanol, 3-thiapentadecanol, trimethylhexanediol, trimethylolpropane, 4-hydroxymethyl-1-phospha-2,6,7-trioxabicyclo-[2.2.2]octane.

1.15. Amides of β-(3,5-di-tert-butyl-4-hydroxvphenyl) propionic acid, for example N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]-propionyloxy)ethyl]oxamide (Naugard®XL-1 (Uniroyal)).

1.16. Ascorbic acid (Vitamin C).

1.17. Aminic anti-oxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-di(2-naphthyl)-p-phenylenediamine, N-isopropyl-N'-phenyl-p-phenylenediamine, N-(1,3-dimethyl-butyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfonamido)-diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylamino-phenol, 4-dodecanoylaminophenol, 4-octadecanoylaminophenol, di(4-methoxyphenyl)-amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-di[(2-methylphenyl)amino]ethane, 1,2-di(phenylamino)propane, (o-tolyl)-biguanide, di[4-(1',3'-dimethylbutyl)-phenyl]-amine, tert-octylated N-phenyl-1-naphthylamine, mixture of mono- and di-alkylated tert-butyl-/tert-octyl-diphenylamines, mixture of mono- and di-alkylated nonyldiphenylamines, mixture of mono- and di-alkylated dodecyldiphenylamines, mixture of mono- and di-alkylated isopropyl-/isohexyl-diphenylamines, mixtures of mono- and di-alkylated tert-butyldiphenylamines, 2,3-dihydro-3,3-dimethyl-4H-1,4-benzothiazine, phenothiazine, mixture of mono- and di-alkylated tert-butyl-/tert-octyl-phenothiazines, mixture of mono- and di-alkylated tert-octylphenothiazines, N-allylphenothiazine, N,N,N',N'-tetraphenyl-1,4-diaminobut-2-ene.

2. UV Absorbers and Light Stabilisers 2.1. 2-(2'-Hydroxvphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzo-triazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxy-phenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzo-triazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethyl-hexyloxy)carbonylethyl]-2'-hydroxyphenyl)benzotriazole, 2-(3'-dodecyl-2'-hydroxy-5'-methyl-phenyl)benzotriazole, 2-(3'-tert-butyl-2'-hydroxy-5'-(2-isooctyloxycarbonylethyl)phenyl-benzotriazole, 2,2'-methylene-bis[4-(1,1,3,3-tetramethylbutyl)-6-benzotriazol-2-yl-phenol]; transesterification product of 2-[3'-tert-butyl-5'-(2-methoxycarbonylethyl)-2'-hydroxyphenyl]-benzotriazole with polyethylene glycol 300; [R—CH$_2$CH$_2$—COO—CH$_2$CH$_2$—]— in which R=3'-tert-butyl-4'-hydroxy-5'-2H-benzotriazol-2-yl-phenyl; 2-[2'-hydroxy-3'-(α,α-dimethylbenzyl)-5'-(1,1,3,3-tetramethylbutyl)phenyl]-benzotriazole; 2-[2'-hydroxy-3'-(1,1,3,3-tetramethylbutyl)-5'-(α,α-dimethylbenzyl)phenyl]-benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy, 2'-hydroxy-4,4'-dimethoxy derivative.

2.3. Esters of unsubstituted or substituted benzoic acids, for example 4-tert-butylphenyl salicylate, phenyl salicylate, octylphenyl salicylate, dibenzoylresorcinol, bis(4-tert-butylbenzoyl)-resorcinol, benzoylresorcinol, 3,5-di-tert-butyl-4-hydroxybenzoic acid 2,4-di-tert-butylphenyl ester, 3,5-di-tert-butyl-4-hydroxybenzoic acid hexadecyl ester, 3,5-di-tert-butyl-4-hydroxybenzoic acid octadecyl ester, 3,5-di-tert-butyl-4-hydroxybenzoic acid 2-methyl-4,6-di-tert-butylphenyl ester.

2.4. Acrylates, for example α-cyano-β,β-diphenylacrylic acid ethyl ester or isooctyl ester, α-methoxycarbonylcinnamic acid methyl ester, α-cyano-β-methyl-p-methoxycinnamic acid methyl ester or butyl ester, α-methoxycarbonyl-p-methoxycinnamic acid methyl ester, N-(β-methoxycarbonyl-β-cyanovinyl)-2-methylindoline.

2.5. Nickel compounds, for example nickel complexes of 2,2'-thio-bis[4-(1,1,3,3-tetramethylbutyl)phenol], such as the 1:1 or 1:2 complex, optionally with additional ligands, such as n-butylamine, triethanolamine or N-cyclohexyldiethanolamine, nickel dibutyl dithio-carbamate, nickel salts of 4-hydroxy-3,5-di-tert-butylbenzylphosphonic acid monoalkyl esters, such as of the methyl or ethyl ester, nickel complexes of ketoximes, such as of 2-hydroxy-4-methylphenylundecyl ketoxime, nickel complexes of 1-phenyl-4-lauroyl-5-hydroxypyrazole, optionally with additional ligands.

2.6. Sterically hindered amines, for example bis(2,2,6,6-tetramethylpiperidin-4-yl)sebacate, bis(2,2,6,6-tetramethylpiperidin-4-yl)succinate, bis(1,2,2,6,6-pentamethylpiperidin-4-yl)sebacate, bis(1-octyloxy-2,2,6,6-tetramethylpiperidin-4-yl) sebacate, n-butyl-3,5-di-tert-butyl-4-hydroxybenzylmalonic acid bis(1,2,2,6,6-pentamethylpiperidyl) ester, condensation product of 1-hydroxyethyl-2,2,6,6-tetramethyl-4-hydroxypiperidine and succinic acid, linear or cyclic condensation products of N,N'-bis(2,2,6,6-tetramethyl-4-piperidyl) hexamethylenediamine and 4-tert-octylamino-2,6-dichloro- 1,3,5-s-triazine, tris(2,2,6,6-tetramethyl-4-piperidyl) nitrilotriacetate, tetrakis(2,2,6,6-tetramethyl-4-piperidyl) 1,2,3,4-butanetetraoate, 1,1'-(1,2-ethanediyl)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro-[4.5]decane-2,4-dione, bis(1-octyloxy-2,2,6,6-tetramethylpiperidyl) sebacate, bis(1-octyloxy-2,2,6,6-tetramethylpiperidyl) succinate, linear or cyclic condensation products of N,N'-bis-(2,2,6,6-tetramethyl-4-piperidyl)hexamethylenediamine and 4-morpholino-2,6-dichloro-1,3,5-triazine, condensation product of 2-chloro-4,6-di(4-n-butylamino-2,2,6,6-tetramethylpiperidyl)-1,3,5-triazine and 1,2-bis(3-aminopropylamino)ethane, condensation product of 2-chloro-4,6-di(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)-pyrrolidine-2,5-dione, mixture of 4-hexadecyloxy- and 4-stearyloxy-2,2,6,6-tetramethylpiperidine, condensation product of N,N'-bis(2,2,6,6-tetramethyl-4-piperidyl) hexamethylenediamine and 4-cyclohexylamino-2,6-dichloro-1,3,5-triazine, condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); condensation product of 1,6-diaminohexane and 2,4,6-trichloro-1,3,5-triazine as well as N,N-dibutylamine and 4-butylamino-2,2,6,6-tetramethylpiperidine (CAS Reg. No. [192268-64-7]; N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro [4.5]-decane, reaction product of 7,7,9,9-tetramethyl-2-cycloundecyl-1-oxa-3,8-diaza-4-oxospiro-4-[4.5]decane and epichlorohydrin, 1,1-bis(1,2,2,6,6-pentamethyl-4-piperidyloxycarbonyl)-2-(4-methoxyphenyl)ethene, N,N'-bis-formyl-N, N'-bis(2,2,6,6-tetramethyl-4-piperidyl) hexamethy-lenediamine, diester of 4-methoxymethylene-malonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic acid anhydride (α-olefin copolymer and 2,2,6,6-tetramethyl-4-aminopiperidine or 1,2,2,6,6-pentamethyl-4-aminopiperidine.

2.7. Oxalic acid diamides, for example 4,4'-dioctyloxyoxanilide, 2,2'-diethoxy oxanilide, 2,2'-dioctyloxy-5,5'-di-tert-butyl oxanilide, 2,2'-didodecyloxy-5,5'-di-tert-butyloxanilide, 2-ethoxy-2'-ethyloxanilide, N,N'-bis(3-dimethylaminopropyl)oxalamide, 2-ethoxy-5-tert-butyl-2'-ethyloxanilide and a mixture thereof with 2-ethoxy-2'-ethyl-5,4'-di-tert-butyloxanilide, mixtures of o- and p-methoxy- and also of o- and p-ethoxy-di-substituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis (2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropyloxy) phenyl]-4,6-bis(2,4-dimethylphenyl)-4-piperidyl) hexamethy-1,3,5-triazine, 2-[2-hydroxy-4-(2-hydroxy-3-octyloxypropyloxy)phenyl]-4,6-bis(2,4-dimethylphenyl)-1,3,5-triazine, 2-[4-(dodecyloxy-/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)-phenyl]-4,6-bis(2,4-dimethylphenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris [2hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hypropyloxy]phenyl}-4,6-bis(2,4-dimethylphenyl)-1,3,5-triazine.

3. Metal deactivators, for example N,N'-diphenyloxalic acid diamide, N-salicylal-N'-salicyloylhydrazine, N,N'-bis (salicyloyl)hydrazine, N,N'-bis(3,5-di-tert-butyl-4-hydroxyphenylpropionyl)-hydrazine, 3-salicyloylamino-1, 2,4-triazole, bis(benzylidene)oxalic acid dihydrazide, oxanilide, isophthalic acid dihydrazide, sebacic acid bis-phenylhydrazide, N,N'-diacetyladipic acid dihydrazide, N,N'-bis-salicyloyloxalic acid dihydrazide, N,N'-bis-salicyloylthiopropionic acid dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecylpentaerythritol diphosphite, bis(2,4-di-tert-butylphenyl) pentaerythritol diphosphite, bis(2,4-dicumylphenyl) pentaerythritol diphosphite, bis(2,6-di-tert-butyl-4-methylphenyl)-pentaerythritol diphosphite, bis-isodecyloxypentaerythritol diphosphite, bis(2,4-di-tert-butyl-6-methylphenyl)-pentaerythritol diphosphite, bis(2,4,6-tri-tert-butylphenyl)pentaerythritol diphosphite, tristearylsorbitol triphosphite, tetrakis(2,4-di-tert-butylphenyl)-4,4'-biphenylene diphosphonite, 6-isooctyloxy-2,4,8,10-tetra-tert-butyl-12H-dibenz[d,g]-1, 3,2-dioxaphos-phocine, bis(2,4-di-tert-butyl-6-methylphenyl)methylphosphite, bis(2,4-di-tert-butyl-6-methylphenyl)ethylphosphite, 6-fluoro-2,4,8,10-tetra-tert-butyl-12-methyl-dibenz[d,g]-1,3,2-dioxaphosphocine, 2,2', 2"-nitrilo[triethyl-tris(3,3',5,5'-tetra-tert-butyl-1,1'-biphenyl-2,2'-diyl)-phosphite], 2-ethylhexyl-(3,3',5,5'-tetra-tert-butyl-1,1'-biphenyl-2,2'-diyl)phosphite, 5-butyl-5-ethyl-2-(2,4,6-tri-tetylphenoxy)-1,3,2-dioxaphosphirane.

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine from hydrogenated tallow fatty amines.

6. Nitrones, for example N-benzyl-alpha-phenylnitrone, N-ethyl-alpha-methylnitrone, N-octylalpha-heptylnitrone, N-lauryl-alpha-undecylnitrone, N-tetradecyl-alpha-tridecylnitrone, N-hexadecyl-alpha-pentadecylnitrone, N-octadecyl-alpha-heptadecylnitrone, N-hexadecyl-alpha-heptadecylnitrone, N-octadecyl-alpha-pentadecylnitrone, N-heptadecyl-alpha-heptadecylnitrone, N-octadecyl-alpha-hexadecylnitrone, nitrones derived from N,N-dialkylhydroxylamines prepared from hydrogenated tallow fatty amines.

7. Thiosynergistic compounds, for example thiodipropionic acid dilauryl ester or thiodipropionic acid distearyl ester or compounds of formula I'

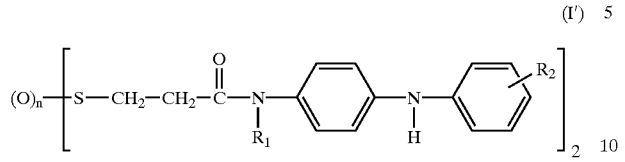

wherein $R_1$ is hydrogen, $C_1$–$C_{12}$alkyl, cyclohexyl, phenyl or benzyl, $R_2$ is hydrogen or $C_1$–$C_4$alkyl, and n is the number 0, 1 or 2.

8. Peroxide-destroying compounds, for example esters of β-thio-dipropionic acid, for example the lauryl, stearyl, myristyl or tridecyl ester, mercaptobenzimidazole, the zinc salt of 2-mercaptobenzimidazole, zinc dibutyldithiocarbamate, dioctadecyidisulfide, pentaerythritol tetrakis(β-dodecylmercapto)propionate.

9. Basic co-stabilisers, for example melamine, polyvinylpyrrolidone, dicyanodiamide, triallyl cyanurate, urea derivatives, hydrazine derivatives, amines, polyamides, polyurethanes, alkali metal and alkaline earth metal salts of higher fatty acids, for example calcium stearate, zinc stearate, magnesium behenate, magnesium stearate, sodium ricinoleate, potassium palmitate, antimony pyrocatecholate or zinc pyrocatecholate.

10. Nucleating agents, for example inorganic substances, for example talc, metal oxides, such as titanium dioxide or magnesium oxide, phosphates, carbonates or sulfates of preferably alkaline earth metals; organic compounds, such as mono- or poly-carboxylic acids and their salts, for example 4-tert-butylbenzoic acid, adipic acid, diphenylacetic acid, sodium succinate or sodium benzoate; polymeric compounds, for example ionic copolymerisates ("ionomers"). Special preference is given to 1,3:2,4-bis(3', 4'-dimethylbenzylidene)sorbitol, 1,3:2,4-di (paramethyldibenzylidene)sorbitol and 1,3:2,4-di (benzylidene)sorbitol.

11. Fillers and reinforcing agents, for example calcium carbonate, silicates, glass fibres, glass beads, talc, kaolin, mica, barium sulfate, metal oxides and hydroxides, carbon black, graphite, wood powders, and powders or fibres of other natural products, synthetic fibres.

12. Other additives, for example plasticisers, lubricants, emulsifiers, pigments, rheology additives, catalysts, flow auxiliaries, optical brighteners, flame retardants, antistatics, blowing agents.

Preferred compositions according to the invention comprise as further additives additionally one or more components from the group of pigments, dyes, fillers, flow auxiliaries, dispersants, plasticisers, vulcanisation activators, vulcanisation accelerators, vulcanisation agents, charge control agents, adhesion promoters, light stabilisers or anti-oxidants, for example phenolic anti-oxidants (points 1.1 to 1.15 of the above list) or aminic anti-oxidants (point 1.17 of the list), organic phosphites or phosphonites (point 4 of the list), lactones and/or thiosynergistic compounds (point 7 of the list).

The following compounds are examples of lactones of the benzofuran-2-one type that are especially suitable, for example 3-[4-(2-acetoxyethoxy)phenyl]-5,7-di-tert-butyl-benzofuran-2-one; 5,7-di-tert-butyl-3-[4-(2-stearoyloxyethoxy)phenyl]-benzofuran-2-one; 3,3'-bis[5,7-di-tertbutyl-3-(4-[2-hydroxyethoxy]-phenyl)-benzofuran-2-one]; 5,7-di-tert-butyl-3-(4-ethoxy-phenyl)benzofuran-2-one; 3-(4-acetoxy-3,5-dimethylphenyl)-5,7-di-tert-butyl-benzofuran-2-one; 3-(3,5-dimethyl-4-pivaloyloxy-phenyl)-5,7-di-tert-butyl-benzofuran-2-one; 5,7-di-tert-butyl-3-phenyl-benzofuran-2-one; 5,7-di-tert-butyl-3-(3,4-dimethylphenyl)-benzofuran-2-one; 5,7-di-tert-butyl-3-(2,3-dimethylphenyl)-benzofuran-2-one; 5,7-di-tert-butyl-3-(2,3,4,5,6-pentamethyl)-benzofuran-2-one; 5-methyl-7-(octadec-2-yl)-3-(3,4-dimethylphenyl)-benzo-furan-2-one; 5-methyl-7-(octadec-2-yl)-3-(2,3-dimethylphenyl)-benzofuran-2-one; 5-tert-butyl-7-(octadec-2-yl)-3-(3,4-dimethylphenyl)-benzofuran-2-one; 5-tert-butyl-7-(octadec-2-yl)-3-(2,3-dimethylphenyl)-benzofuran-2-one and the compound of the following formula L.

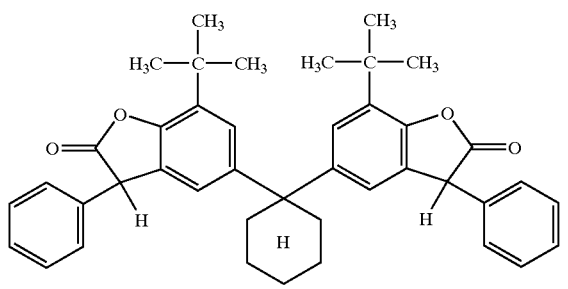

Of very special interest in this context is Irganox HP-136 (RTM) (Ciba Spezialitatenchemie AG), which is available commercially and is a mixture of about 85 parts by weight of the compound of formula A and about 15 parts by weight of the compound of formula B.

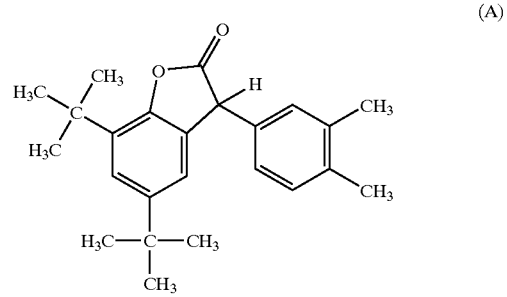

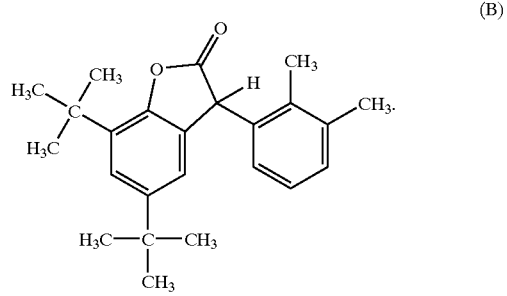

The additional additives are added, for example, in concentrations of from 0.01 to 10%, based on the dry solids content of the emulsion crude rubber, synthetic latex or natural rubber latex to be stabilised.

The incorporation of component (b) of formula I or the combination thereof with component (c) of formula II and optionally further additives into the emulsion crude rubber, synthetic latex or natural rubber latex is carried out according to known methods, preferably after polymerisation or during the preparation of the mixture or before or during shaping, optionally with subsequent removal of a solvent by evaporation. Component (b) of formula I or the combination thereof with component (c) of formula II and optionally further additives may also be added to the emulsion crude rubber to be stabilised in the form of a master batch comprising those components, for example, in a concentration of from 2.5 to 25% by weight each.

Component (b) of formula I or the combination thereof with component (c) of formula II and optionally further additives are especially preferably added before or during the polymerisation of synthetic emulsion crude rubbers or after the polymerisation to rubber latex has been stopped.

Component (b) of formula I or the combination thereof with component (c) of formula II and optionally further additives may be added before or during the polymerisation of latices or before crosslinking.

Component (b) of formula I or the combination thereof with component (c) of formula II and optionally further additives may be incorporated into the emulsion crude rubber, synthetic latex or natural rubber latex to be stabilised in pure form or encapsulated in waxes, oils or polymers.

The resulting stabilised emulsion crude rubbers can be used further in a wide variety of forms, for example in the form of strips, moulding materials, profiles, conveyor belts or tyres, by mixing them with the customary formulation constituents according to one of the usual processes and vulcanising them (for example with sulfur or peroxide).

The resulting stabilised latices can be used further in a wide variety of forms, for example in the form of films, strips, moulding materials, in the paper industry, for example, in paper coatings; in the adhesives industry, for example, in dispersion adhesives; in the dyestuffs industry for disperse dyes and also in the textiles industry and, in the latter case, specifically in the field of carpeting, by mixing the latices with the customary formulation constituents according to one of the usual processes, applying them, for example, to the reverse side of a carpet, and drying them.

The present invention relates also to a method of stabilising an emulsion crude rubber, synthetic latex or natural rubber latex subject to oxidative, thermal, dynamic and/or light-induced degradation, in which method at least one compound of formula I and optionally at least one compound of formula II is mixed with that material or applied thereto.

A further embodiment of the present invention is the use of compounds of formula I, optionally in combination with at least one compound of formula II, for stabilising an emulsion crude rubber, synthetic latex or natural rubber latex subject to oxidative, thermal, dynamic and/or light-induced degradation.

The preferred components (b) and (c) for the uses and methods disclosed above are the same as those described for the compositions comprising an emulsion crude rubber, synthetic latex or natural rubber latex.

The following Examples illustrate the invention further. Percentages relate to weight, unless otherwise indicated.

EXAMPLE 1

Stabilisation of Emulsion Crude Rubber

The rubber used for Example 1 is an emulsion SBR (E-SBR) type 1502, which is available in the form of stabiliser-free latex from a rubber manufacturer. E-SBR type 1502 is a styrenebutadiene copolymer comprising 23.5% bound styrene in the polymer. It is polymerised at +5° C. in an aqueous emulsion using resinous fatty soaps and comprises a non-discolouring stabiliser. That commercially used stabiliser is omitted for carrying out the tests. All the stabilisers according to Table 1 are stirred into the E-SBR latex, which is heated to 65° C., in the form of potassium stearate emulsions. The stabiliser emulsion is prepared in customary manner using the following formulation: 100 parts by weight of stabiliser, 10 parts by weight of stearic acid, 2 parts by weight of potassium hydroxide, 1 part by weight of triethanolamine and 199 parts by weight of demineralised water. For creaming up, there are then added 100 g of 10% NaCI solution per litre of latex. After stirring for a further 5 minutes, 0.6% sulfuric acid is added dropwise until the pH value is constant at from 3.8 to 4.0. The rubber particles are then skimmed off and washed twice for 10 minutes at 60° C. in demineralised water. The washed rubber is dewatered on a rubber roller and the resulting sheets are dried for 12 hours at 60° C. in a vacuum drying cabinet. The Mooney viscosity of the sheets is measured according to ASTM D 1646. Firstly, the initial viscosity ML 1+4(100) is determined according to ASTM D 1646 (Mooney), and then the samples are aged at 90° C. in a circulating-air oven. After 3 and 4 weeks' ageing, the Mooney viscosity is determined again according to ASTM D 1646. The lower the values, the better is the stabilisation of the emulsion crude rubber. The results are compiled in Table 1.

TABLE 1

| Examples | Stabilisers | Initial viscosity | Mooney viscosity ML 1 + 4(100) after 3 weeks | 4 weeks |
|---|---|---|---|---|
| 1a[a)] | — | 51 | >>100 | n.m.[f)] |
| 1b[b)] | 0.2% compound A[c)] | 52 | 74 | n.m.[f)] |
| 1c[b)] | 0.2% compound B[d)] | 52 | 75 | n.m.[f)] |
| 1d[a)] | 0.2% Irganox 1520[e)] | 51 | 72 | n.m.[f)] |
| 1e[b)] | 0.1% compound A[c)] 0.1% Irganox 1520[e)] | 53 | 48 | 62 |
| 1f[b)] | 0.1% compound B[d)] 0.1% Irganox 1520[e)] | 53 | 50 | 59 |

For footnotes a), b), c), d), e) and f), see end of Table 3 (Example 3).

EXAMPLE 2

Stabilisation of Emulsion Crude Rubber

Coagulation of the emulsion crude rubber takes place in a batch size of 250 g of rubber according to the polyamine process (Superfloc C 567). The stabilisers according to Table 2 are stirred into the E-SBR latex in the form of emulsions/dispersions. In a 10 litre coagulation vessel, 5 litres of demineralised water are adjusted to a pH of from 2.9 to 3.1 with dilute sulfuric acid. As flocculant there are added 0.8 parts=2.0 g of Superfloc C 567, calculated on the basis of the batch size of 250 g of solid rubber to be coagulated. The serum is heated to 65° C. and the latex is slowly added to the serum with vigorous stirring. The total duration of coagulation is 45 minutes. Thereafter the rubber is skimmed off and then washed for 15 minutes at 65° C. in three litres of water of pH 4.0 and subsequently for 15 minutes at 65° C. in neutral water. For drying, the rubber is first dewatered on a rubber roller at room temperature and then dried for 12 hours at 60° C. in a vacuum drying cabinet. Analogously to Example 1, the Mooney viscosity of the sheets is measured according to ASTM D 1646. Firstly, the initial viscosity ML 1+4(100) is determined according to ASTM D 1646 (Mooney), and then the samples are aged at 90° C. in a circulating-air oven. After 2 and 3 weeks' ageing, the Mooney viscosity is determined again according to ASTM D 1646. The lower the values, the better is the stabilisation of the emulsion crude rubber. The results are compiled in Table 2.

TABLE 2

| Examples | Stabilisers | Initial viscosity | Mooney viscosity ML 1 + 4(100) after 3 weeks | 4 weeks |
|---|---|---|---|---|
| 2a[a)] | — | 48 | >100 | n.m.[f)] |
| 2b[b)] | 0.15% compound A[c)] | 50 | 78 | n.m.[f)] |
| 2c[b)] | 0.15% compound B[d)] | 49 | 71 | n.m.[f)] |
| 2d[b)] | 0.15% compound C[g)] | 50 | 71 | n.m.[f)] |
| 2e[a)] | 0.15% Irganox 1135[h)] | 50 | 83 | n.m.[f)] |
| 2f[a)] | 0.15% Irganox 1520[e)] | 50 | 71 | n.m.[f)] |
| 2g[b)] | 0.075% compound A[c)] 0.075% Irganox 1520[e)] | 48 | 62 | 75 |
| 2h[b)] | 0.075% compound B[d)] 0.075% Irganox 1520[e)] | 48 | 48 | 61 |
| 2i[b)] | 0.075% compound C[g)] 0.075% Irganox 1520[e)] | 50 | 45 | 54 |
| 2k[a)] | 0.075% Irganox 1135[h)] 0.075% Irganox 1520[e)] | 47 | 81 | n.m.[f)] |

For footnotes a), b), c), d), e), f), g) and h), see end of Table 3 (Example 3).

EXAMPLE 3

Stabilisation of Carboxylated Styrene-butadiene Latex (X-SBR)

The stabilisers according to Table 3 are mixed with non-ionic surfactants, such as TWEEN 80 (RTM) [polyoxyethylenesorbitan fatty acid ester] and SPAN 80 (RTM) [sorbitan monooleate] (ICI Surfactants) in a ratio of 90:8:2. The resulting mixtures are stirred into water in a ratio of 4:6. The resulting stabiliser emulsions are each stirred into the stabiliser-free X-SBR latex KSL (Kumho Petrochemical Co. (Korea)). The concentrations given below in Table 3 are percentages of stabiliser substance, calculated on the basis of the latex solids content (48.2%). The latices are poured into petri dishes so that, after drying, films having a layer thickness of 0.2 mm are formed. The films are aged at 135° C. in a circulating-air oven. The Yellowness Index (YI) of those films is measured according to ASTM D 1925-70 before ageing and after 16 hours' ageing. The discolouration ($\Delta$) YI is a measure of the effectiveness of the additives used. As discolouration increases, the film also begins to lose flexibility. Low YI values denote little discolouration, high YI values denote severe discolouration of the samples. The lower the discolouration, the more effective is the stabiliser or stabiliser mixture. The results are compiled in Table 3.

TABLE 3

| Examples | Stabilisers | YI after 0 hours | YI after 16 hours | ($\Delta$) YI |
|---|---|---|---|---|
| 3a[a)] | — | 8 | 68 | 60 |
| 3b[b)] | 0.25% compound A[c)] | 6 | 41 | 35 |
| 3c[b)] | 0.25% compound B[d)] | 7 | 51 | 44 |
| 3d[b)] | 0.25% compound C[g)] | 6 | 51 | 45 |
| 3e[a)] | 0.25% Irganox 1135[h)] | 7 | 59 | 52 |
| 3f[a)] | 0.25% Irganox 1520[e)] | 5 | 56 | 51 |
| 3g[b)] | 0.125% compound A[c)] 0.125% Irganox 1520[e)] | 6 | 44 | 38 |
| 3h[b)] | 0.125% compound B[d)] 0.125% Irganox 1520[e)] | 6 | 38 | 32 |

TABLE 3-continued

| Examples | Stabilisers | YI after 0 hours | YI after 16 hours | ($\Delta$) YI |
|---|---|---|---|---|
| 3i[b)] | 0.125% compound C[g)] 0.125% Irganox 1520[e)] | 6 | 43 | 37 |
| 3k[a)] | 0.125% Irganox 1135[h)] 0.125% Irganox 1520[e)] | 6 | 56 | 50 |

[a)]Comparative Example
[b)]Example according to the invention.
[c)]Compound A is β-(5-tert-butyl-4-hydroxy-3-methylphenyl)propionic acid isooctyl ester.
[d)]Compound B is β-(5-tert-butyl-4-hydroxy-3-methylphenyl)propionic acid isotridecyl ester.
[e)]Irganox 1520 (RTM) (Ciba Spezialitätenchemie AG) is 4,6-bis (octylthiomethyl)-o-cresol.
[f)]n.m. denotes "not measurable" because the value is too high, that is to say the measuring range of the apparatus is exceeded.
[g)]Compound C is β-(5-tert-butyl-4-hydroxy-3-methylphenyl)propionic acid isododecyl ester.
[h)]Irganox 1135 (RTM) (Ciba Spezialitätenchemie AG) is β-(3,5-bis-tert-butyl-4-hydroxyphenyl)propionic acid isooctyl ester.

What is claimed is:

1. A composition comprising
    a) an emulsion crude rubber, synthetic latex or natural rubber latex subject to oxidative, thermal, dynamic and/or light-induced degradation,
    b) as stabiliser at least one compound of formula I (I)

[Chemical structure of formula I showing a phenol with tert-butyl group, methyl group, and CH$_2$—CH$_2$—C(=O)—OR$^1$ substituent]

wherein R$^1$ is C8–C$_{20}$alkyl; and
    c) as stabiliser at least one compound of formula II (II)

[Chemical structure of formula II showing a phenol with R$^3$, R$^4$, R$^5$ substituents and CH$_2$—S—R$^2$ group]

wherein
    R$^2$ is C$_8$–C$_2$alkyl,
    R$^3$ is hydrogen, C$_1$–C$_{12}$alkyl, cyclohexyl, 1-methylcyclohexyl, benzyl, α-methylbenzyl, α,α-dimethylbenzyl or —CH$_2$—S—R$^2$,
    R$^4$ is C$_1$–C$_{12}$alkyl, benzyl, α-methylbenzyl, α,α-dimethylbenzyl or —CH$_2$—S—R$^2$, and
    R$^5$ is hydrogen or methyl.

2. A composition according to claim 1, wherein R$^1$ is a branched C$_8$–C$_{13}$alkyl.

3. A composition according to claim 1, wherein R$^1$ is isooctyl and/or isotridecyl.

4. A composition according to claim 1, wherein R$^2$ is C$_8$alkyl or C$_{12}$alkyl.

5. A composition according to claim 1, wherein
    R$^3$ is C$_1$–C$_4$alkyl or benzyl,
    R$^4$ is C$_1$–C$_4$alkyl or —CH$_2$—S—R$^2$, and
    R$^5$ is hydrogen or methyl.

6. A composition according to claim 1, wherein
$R^2$ is $C_8$alkyl or $C_{12}$alkyl,
$R^3$ is methyl,
$R^4$ is —CH$_2$—S—R$^2$, and
$R^5$ is hydrogen.

7. A composition according to claim 1, comprising from 0.01 to 10% by weight of component (b) of formula I, based on the weight of the dry solids content of component (a).

8. A composition according to claim 1, comprising from 0.01 to 5% by weight of component (b) of formula I and from 0.01 to 5% by weight of component (c) of formula II, based on the weight of the dry solids content of component (a).

9. A composition according to claim 1, wherein component (a) is a pale emulsion crude rubber, a pale synthetic latex or a pale natural rubber latex.

10. A composition according to claim 1, wherein component (a) is a polydiene emulsion crude rubber, a halogen-containing polydiene emulsion crude rubber or a styrene-butadiene copolymer emulsion crude rubber.

11. A composition according to claim 1, wherein component (a) is a carboxylated styrene-butadiene, a styrene-acrylic acid, a vinyl acetate-acrylate or a carboxylated butadiene-acrylonitrile.

12. A composition according to claim 1, wherein component (a) is a carboxylated styrene-butadiene latex (X-SBR).

13. A composition according to claim 1, comprising in addition to components (a), (b) and (c) additionally further additives.

14. A composition according to claim 13, comprising as further additives additionally one or more components from the group of pigments, dyes, fillers, flow auxiliaries, dispersants, plasticisers, charge control agents, adhesion promoters, further anti-oxidants and/or light stabilisers.

15. A composition according to claim 14, comprising as further additives further phenolic anti-oxidants, aminic anti-oxidants, organic phosphites or phosphonites, lactones and/or thiosynergistic compounds.

16. A method of stabilising an emulsion crude rubber, synthetic latex or natural rubber latex subject to oxidative, thermal, dynamic and/or light-induced degradation, in which method at least one compound of formula I and at least one compound of formula II according to claim 1 is mixed with that material.

* * * * *